April 11, 1950     P. H. BALSBAUGH     2,503,990
NUT AND FRUIT GATHERER
Filed Jan. 15, 1948     2 Sheets-Sheet 2
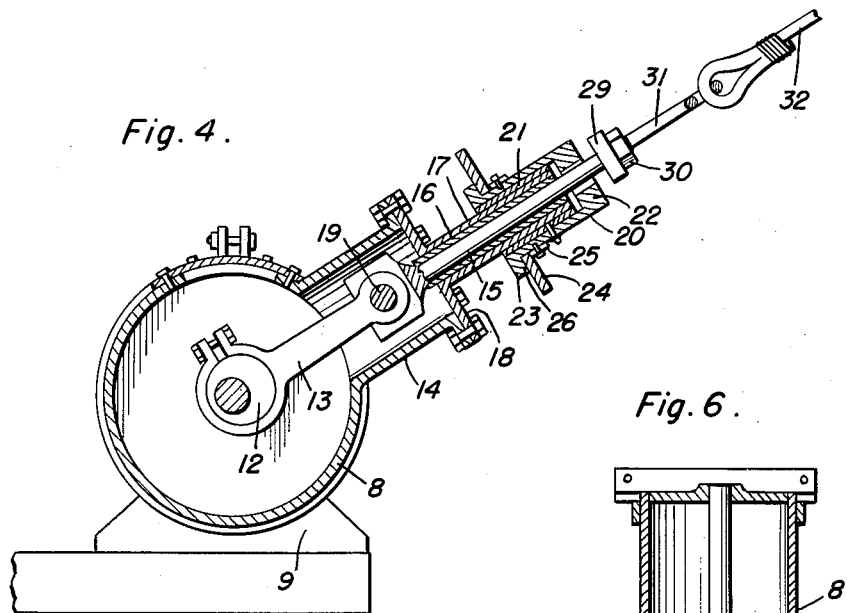
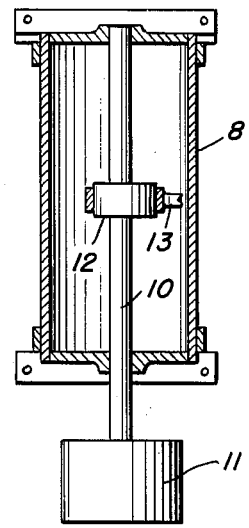
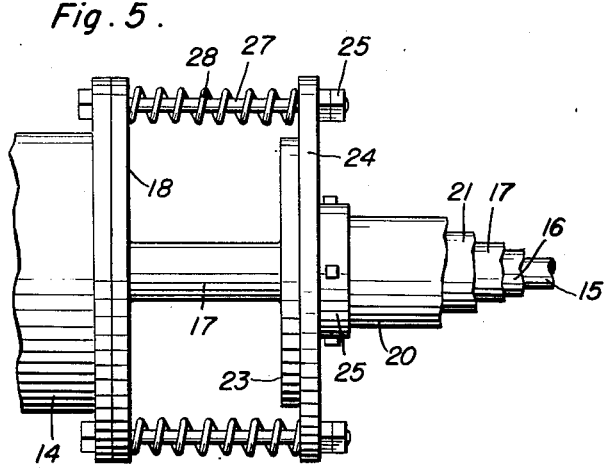
Inventor
Paul H. Balsbaugh
By Clarence A. O'Brien
and Harvey B. Jacobson
Attorneys Patented Apr. 11, 1950

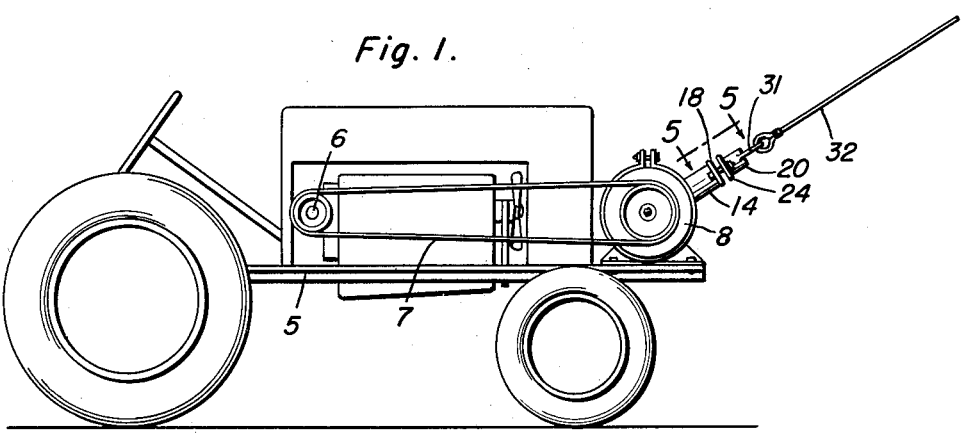
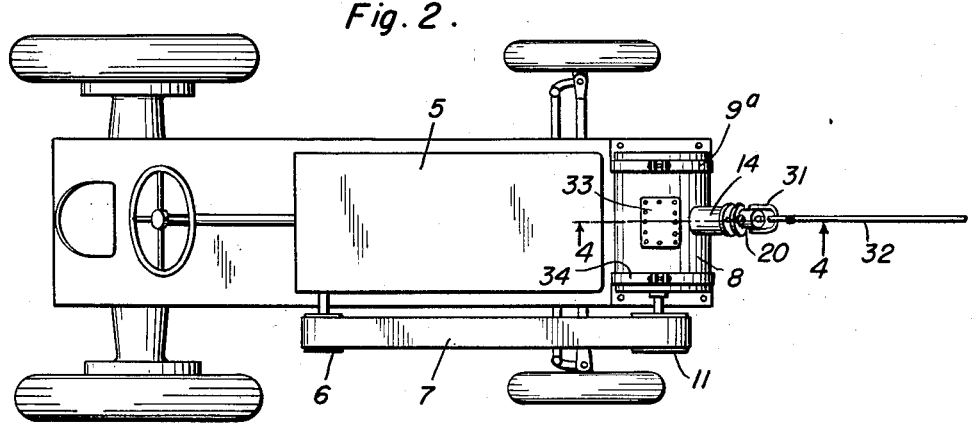
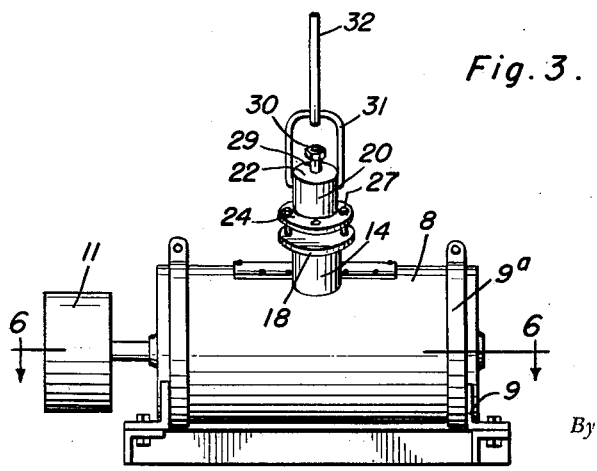

2,503,990

UNITED STATES PATENT OFFICE 2,503,990

NUT AND FRUIT GATHERER

Paul H. Balsbaugh, Modesto, Calif.

Application January 15, 1948, Serial No. 2,391

2 Claims. (Cl. 56—328)

The present invention relates to new and useful improvements in tree shaking machines for the purpose of gathering nuts or fruits ripened on the trees.

An important object of the invention is to provide a tractor operated tree shaker of this character and embodying means for oscillating a cable attached to a tree whereby to vibrate the tree to shake the ripened fruit or nuts therefrom.

Another object of the invention is to provide a tractor operated device of this character which eliminates the use of long poles to provide the shaking action whereby the tractor may be freely moved through an orchard without interference by the trees.

Another object is to provide an apparatus of this character which may be easily and quickly mounted in position on a tractor for operation by the power take-off of the tractor and without necessitating any changes or alterations in the construction thereof.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view.

Figure 2 is a top plan view.

Figure 3 is an enlarged front elevational view of the cable oscillating unit.

Figure 4 is an enlarged sectional view through the unit taken substantially on the line 4—4 of Figure 2.

Figure 5 is an enlarged plan view of the vibrating connection for the cable, and Figure 6 is a longitudinal sectional view of the housing for the eccentric and taken on a line 6—6 of Figure 3.

Referring now to the drawings in detail wherein for the purpose of illustration, I have disclosed a preferred embodiment of the invention, the numeral 5 designates a conventional type of farm tractor having a power take-off pulley 6 driving a belt 7. A cylindrical housing 8 is secured in position to the front end of the frame of the tractor by saddle supports 9 bolted to the frame and having split clamping bands 9a welded or otherwise suitably secured to the supports and clamped about the housing. A shaft 10 is journalled in the ends of the housing and with a pulley 11 secured to one end of the shaft driven by the belt 7.

An eccentric 12 is secured to the shaft within the housing driving a pitman or connecting rod 13 which extends radially of the housing 8 into a radial chamber 14 carried at the front upper portion of the housing.

A shaft 15 is reciprocably mounted in a bushing 16 enclosed in a sleeve 17 having a flange 18 at its inner end bolted to the outer end of chamber 14. The inner end of the shaft projecting into the chamber is connected to the connecting rod 13 by a wrist pin 19.

A sleeve 20 is slidable on the outer end of sleeve 17 with a bushing 21 therebetween, the outer end of the sleeve 20 being closed to provide an anvil 22. The inner end of sleeve 20 is formed with a flange 23 held against the rear face of an annular plate 24 by a retaining ring 25. A bearing assembly 26 is positioned between the flange 23 and plate 24 to facilitate rotation of sleeve 20.

A plurality of rods 27 extend forwardly from the flange 18 and on which the plate 24 is slidably mounted and held thereon by nuts 25 threaded on the front ends of the rods. Coil springs 28 are mounted on the rods between the flange 18 and the plate 24 to exert their influence on the plate in a forward direction and provide shock absorbing means between the plate 24 and the flange 18.

The front end of the shaft 15 is slidable in the end 22 of sleeve 20 and the front end of the shaft is provided with a hammer 29 held in position thereon by a nut 30.

A wire bale 31 is secured to sleeve 20 and to which the rear end of a cable 32 is attached.

In the operation of the device, the front end of cable 32 is attached to the trunk or limb of a tree and the shaft 10 is driven by the power take-off of the tractor whereby the eccentric 12, connecting rod 13 and shaft 15 will impart a reciprocating movement to the cable to shake the tree and cause the ripened nuts or fruit to fall therefrom.

The hammer 29 strikes the anvil 22 a sharp blow during reciprocation of shaft 15 to also cause a vibration of the cable. The housing 8 may contain a quantity of lubricating oil to lubricate the working parts and is provided with a removable inspection plate 33.

The housing may be rotatably adjusted in the clamps 9a to swing shaft 15 vertically to exert a straight pulling force on cable 32 by said shaft.

In view of the foregoing description taken in conjunction with the accompanying drawings it is believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

Having described the invention what is claimed as new is:

1. A tree shaking device comprising a horizontal rotary shaft, a housing for said shaft, a shaft housing projecting radially of the first named housing, a second shaft reciprocably mounted in the second housing and operatively connected to the first shaft, a cable connecting the outer end of the second shaft to an object, a hammer carried by the second shaft, an anvil freely carried by the second named housing in the path of retracting movement of the hammer, and recoil means connecting the anvil to the second housing to set up vibration in the cable.

2. A tree shaking device comprising a horizontal shaft housing, a rotary power operated shaft in the housing, means supporting the housing for rotatable adjustment, a second shaft housing projecting radially from the first shaft housing, a reciprocable shaft in the second shaft housing and operatively connected to the first mentioned shaft, and a cable attached to the outer end of the second-named shaft for attaching to a tree in an upwardly inclined position, said second shaft housing being swingable on the axis of the first shaft housing according to the inclination of the cable to exert a straight pull on the cable by the reciprocating shaft.

PAUL H. BALSBAUGH.

REFERENCES CITED

The following references are of record in the file of this patent:

UNITED STATES PATENTS

| Number | Name | Date |
|---|---|---|
| 1,027,403 | Darling | May 28, 1912 |
| 1,290,531 | Evert | Jan. 7, 1919 |
| 1,472,262 | Abildgaard | Oct. 30, 1923 |
| 2,159,311 | Berger | May 23, 1939 |

OTHER REFERENCES

"The Mechanical Tree Shaker," by Fairbank and Serr, Diamond Walnut News, July 1943, pages 4–6.

"Mechanical Harvesting of Walnuts Is Making Progress," by Serr and Fairbank, Diamond Walnut News, May 1944, pages 8–10.

"Pecan Gathering Device Promising for Georgians," by Press Huddleston, The Atlanta Constitution, Nov. 23, 1945, page 18.

"That's Something Jim Developed," by Frank J. Taylor, Country Gentleman, May 1948, pages 20, 21 and 86–89.